(12) United States Patent
Santhoff et al.

(10) Patent No.: US 6,937,674 B2
(45) Date of Patent: Aug. 30, 2005

(54) MAPPING RADIO-FREQUENCY NOISE IN AN ULTRA-WIDEBAND COMMUNICATION SYSTEM

(75) Inventors: John H. Santhoff, Panama City Beach, FL (US); Rodolfo T. Arrieta, Panama City Beach, FL (US); Charles E. Miller, Panama City Beach, FL (US)

(73) Assignee: Pulse-LINK, Inc., Carlsbad, CA (US)

( * ) Notice: Subject to any disclaimer, the term of this patent is extended or adjusted under 35 U.S.C. 154(b) by 867 days.

(21) Appl. No.: 09/802,603

(22) Filed: Mar. 9, 2001

(65) Prior Publication Data

US 2004/0264609 A1 Dec. 30, 2004

Related U.S. Application Data

(60) Provisional application No. 60/255,469, filed on Dec. 14, 2000.

(51) Int. Cl.[7] .................................. H03D 1/04
(52) U.S. Cl. ......................... 375/346; 375/138
(58) Field of Search .................. 375/346, 225, 375/347, 348, 132, 138; 370/280, 281, 294, 321, 337, 302; 455/522, 69, 67.5

(56) References Cited

U.S. PATENT DOCUMENTS

| | | | |
|---|---|---|---|
| 3,668,639 A | 6/1972 | Harmuth | 340/166 R |
| 3,678,204 A | 7/1972 | Harmuth | 179/15 BC |
| 4,506,267 A | 3/1985 | Harmuth | 343/744 |
| 4,641,317 A | 2/1987 | Fullerton | 375/1 |
| 4,651,152 A | 3/1987 | Harmuth | 342/13 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,056,051 A * | 10/1991 | Tkalcevic | 702/106 |
| 5,134,408 A | 7/1992 | Harmuth | 342/21 |
| 5,148,174 A | 9/1992 | Harmuth | 342/21 |
| 5,153,595 A | 10/1992 | Harmuth | 342/22 |
| 5,159,343 A | 10/1992 | Harmuth | 342/22 |
| 5,189,701 A * | 2/1993 | Jain | 704/207 |
| 5,237,587 A * | 8/1993 | Schoolcraft | 375/150 |
| 5,307,081 A | 4/1994 | Harmuth | 343/842 |
| 5,325,203 A * | 6/1994 | Nojima et al. | 348/607 |
| 5,363,108 A | 11/1994 | Fullerton | 342/27 |
| 5,365,240 A | 11/1994 | Harmuth | 343/701 |
| 5,493,691 A | 2/1996 | Barrett | 455/20 |
| 5,523,758 A | 6/1996 | Harmuth | 342/22 |
| 5,586,145 A | 12/1996 | Morgan et al. | 375/239 |
| 5,589,884 A * | 12/1996 | Ohguchi | 375/240.03 |
| 5,592,177 A | 1/1997 | Barrett | 342/361 |
| 5,610,907 A | 3/1997 | Barrett | 370/342 |
| 5,677,927 A | 10/1997 | Fullerton et al. | 375/200 |
| 5,687,169 A | 11/1997 | Fullerton | 370/324 |
| 5,901,172 A | 5/1999 | Fontana et al. | 375/200 |
| 6,031,862 A | 2/2000 | Fullerton et al. | 375/200 |
| 6,118,817 A * | 9/2000 | Wang | 375/240.03 |
| 6,249,299 B1 * | 6/2001 | Tainer | 340/572.4 |
| 6,275,522 B1 * | 8/2001 | Johnson et al. | 375/224 |
| 6,363,345 B1 * | 3/2002 | Marash et al. | 704/226 |
| 6,519,559 B1 * | 2/2003 | Sirivara | 704/227 |
| 6,721,561 B1 * | 4/2004 | Jeong et al. | 455/433 |

* cited by examiner

*Primary Examiner*—Emmanuel Bayard
(74) *Attorney, Agent, or Firm*—Pulse-LINK, Inc.

(57) ABSTRACT

A system and method for mapping radio-frequency (RF) noise, and estimating channel quality in a multi-channel ultra-wideband communication system is provided. One method includes placing a plurality of time bins within a plurality of time frames and assigning a plurality of UWB communication channels comprising selected time bins. RF noise amplitude data is then sampled from selected time bins. The sampled RF noise amplitude data from the time bins is then averaged, thereby obtaining an average RF noise amplitude in each of the plurality of channels. The RF noise amplitude indicates the amount of RF noise present in a channel. The channels may then be ranked based on the characteristics of the RF noise.

46 Claims, 14 Drawing Sheets

MAPPING RADIO-FREQUENCY NOISE IN AN ULTRA-WIDEBAND COMMUNICATION SYSTEM

Priority is claimed from U.S. Provisional Application Ser. No. 60/255,469, filed on Dec. 14, 2000, entitled "Ultra-wideband Communication System and Method", which is incorporated herein by reference in its entirety.

FIELD OF THE INVENTION

The field of the present invention generally relates to wireless communication systems. More particularly, the invention concerns a method to map radio frequency noise in an ultra-wideband communication system.

BACKGROUND OF THE INVENTION

Wireless communication systems are changing the way people work, entertain themselves, and communicate with each other. For example, the wide acceptance of mobile devices, such as the portable phone, has enabled great mobility while enabling easy voice and data communication with family, friends, and co-workers. As more features are added to these mobile wireless devices, users are able to receive a wider variety of information to facilitate enhanced entertainment and to more efficiently solve business problems. Data, such as computer files, graphics, video, and music may now be sent from a remote location and received at mobile wireless devices. Such wide area uses generally require a series of fixed transceivers arranged to communicate with the mobile wireless devices. In such a manner, the wireless device is enabled to communicate so long as the wireless device remains in contact with at least one of the fixed transceivers.

Not only is the use of such wide area systems expanding, but the use of local wireless communication systems is also growing. For example, wireless devices in a single building, such as a residence, may be configured to share information. Such local wireless communication systems may enable computers to control peripherals without physical connections, stereo components to communicate, and almost any appliance to have access to the Internet to send and receive information.

The amount of data being sent on both wide and local communication systems is mushrooming, and may quickly exceed the bandwidth available in the traditional communication bands. It has been recognized that a relatively new communication technology, "ultra-wideband" (UWB) may provide assistance in meeting the ever increasing bandwidth demands. For example, U.S. Pat. No. 6,031,862, entitled "Ultra-wideband Communication System and Method", discloses a communication system using an impulse radio system. Impulse radio is a form of UWB communication using individually pulsed monocycles emitted at intervals of many nanoseconds to fractions of nanosecond intervals to transmit a digital signal. A UWB communication system enables communication at a very high data rate, such as 100 megabit per second or greater.

Currently, with the vast amount of data being sent across local and wide area communication systems, radio frequency (RF) "noise" is impacting the reliability of data links. Unrelated UWB devices transmitting and receiving data independent and/or unaware of one another, in conjunction with natural or spurious man-made noise can create environments where signals "step" on one another (i.e., cancel one another out, amplify or interfere with one another). For example, UWB devices sending and receiving data unaware of one another might include instances where two or more UWB devices or a local home or office network are communicating in the same environment. Similarly, noise might be generated from a laptop computer, or other devices that can resonate, creating additional RF noise that can impact UWB communications.

Therefore, there exists a need for an ultra-wideband communication system that can operate reliably in today's noisy RF environment.

SUMMARY OF THE INVENTION

In order to overcome the deficiencies with known, conventional ultra-wideband communication systems, a method for mapping the RF noise floor is provided. Briefly, the method includes placing a plurality of time bins within a plurality of time frames and assigning a plurality of UWB communication channels comprising selected time bins. RF amplitude data is then sampled from selected time bins. The sampled RF amplitude data from the time bins is then averaged, thereby obtaining an average RF amplitude in each of the plurality of channels. The RF amplitude indicates the amount of RF noise present in a channel.

The channels may then be ranked based on the characteristics of the RF noise. Channels with low RF noise may be ranked as high quality channels, suitable for carrying high data-rate transmissions. Channels with higher RF noise may then be ranked as lower quality channels, suitable for carrying less data intensive transmissions.

In another aspect of the invention, an absolute value of a difference between the RF amplitude average in corresponding time bins in each of several channels is determined, thereby obtaining a change in the RF amplitude average in corresponding time bins across multiple channels.

In another aspect, the present invention further includes steps for determining an absolute value of a difference of the change in the RF amplitude average in corresponding time bins across several channels, thereby obtaining a rate of change in the RF amplitude average in corresponding time bins across multiple channels.

The change and rate of change in RF amplitudes (i.e. RF noise) may indicate whether the RF noise is periodic or substantially constant, or if the RF noise is recurring. One advantage of the present invention is that UWB channels containing large amounts of RF noise can be avoided, or used to send very low data-rate transmissions, thereby increasing the quality and reliability of UWB communications.

These and other features and advantages of the present invention will be appreciated from review of the following detailed description of the invention, along with the accompanying figures in which like reference numerals refer to like elements throughout.

Figure 1:
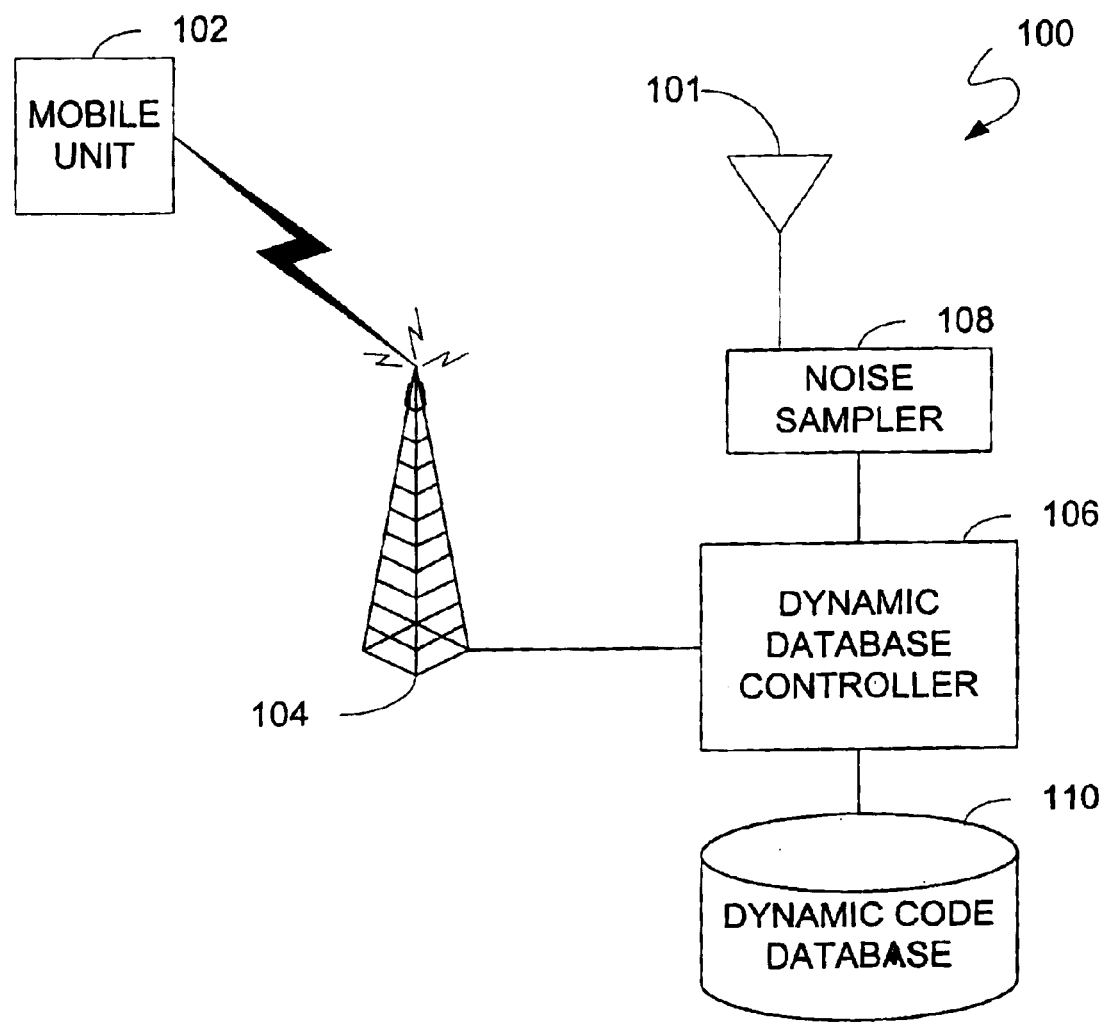
FIG. 1 is a schematic diagram of an exemplary ultra-wideband communication system capable of utilizing a multiple access scheme in accordance with an embodiment of the present invention.

It will be recognized that some or all of the figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached figures. Throughout this description, the preferred embodiment and examples shown should be considered as exemplars, rather than as limitations on the present invention. As used herein, "the present invention" and "the invention" refer to any one of the embodiments of the invention described herein.

"Ultra-wideband" (UWB) is also known as "carrier-free", "baseband" or "impulse" technology. The basic concept is to develop, transmit and receive an extremely short duration burst of radio-frequency (RF) energy—typically a few tens of picoseconds (trillionths of a second) to a few hundred nanoseconds (billionths of a second) in duration. These bursts represent from one to only a few cycles of an RF carrier wave. The resultant waveforms are extremely broadband, so much so that it is often difficult to determine an actual RF center frequency—thus, the term "carrier-free".

In addition, because of the extremely short duration waveforms of UWB communications, packet burst and time division multiple access (TDMA), as well as code division multiple access (CDMA) protocols for multi-user communications can be implemented. However, implementation of TDMA and CDMA concepts into a UWB communication system requires novel methodologies and approaches.

Code Division Multiple Access (CDMA) is a digital spread-spectrum modulation technique that is transmitted over radio frequency waves and used mainly with personal communications devices such as mobile phones. It uses mathematical codes to transmit and distinguish between multiple wireless conversations. CDMA and CDMA-like methods can be used in a UWB communication system constructed according to the present invention to increase the number of users that can be supported from one or more base stations.

Attending the increase of the number of users is an increase of the amount of "noise" generated in the radio frequency (RF) spectrum. The vast amount of data being sent across communication systems creates a vast amount of RF noise, which impacts the reliability of data links. Unrelated UWB devices transmitting and receiving data independent and/or unaware of one another, in conjunction with natural or spurious man-made noise can create environments where signals "step" on one another (i.e., cancel one another out, amplify or interfere with one another).

For example, UWB channels sending and receiving data unaware of one another might include instances where two or more stand-alone UWB devices or a local home or office network are communicating in the same environment. Similarly, noise might be generated from a wide variety of devices from spark ignition engines to laptop computers. These, or other devices can forseeably be generating UWB pulse trains into channels already consumed by other UWB activity in the area. This potentially causes competition for bandwidth and/or pulse channels that may cause data errors. Inserting a UWB channel into this noise can reduce the quality of the channel, and reception of the UWB channel can be lost, as separating the noise from the timed pulses can become difficult.

The need to seek out and find a suitable unassigned channels increases proportionately as a function of increased number of users, increased channel capacity demands, and increased noise. In high-density, multi-user, high capacity consumption and/or noisy environments the availability of acceptable unassigned channels decreases. The resultant effect can mean greater demands on the system to search for suitable unassigned UWB channels.

To solve this problem, a UWB communication system may employ a plurality of distinct communication channels that may be managed and organized using the methods and devices described in U.S. patent application, Ser. No. 09/746,348, entitled "Pre-testing and Certification of Multiple Access Codes", filed Dec. 21, 2000, and U.S. patent application, Ser. No. to be assigned, entitled "Encoding and Decoding Ultra-Wideband Information," which are incorporated herein by reference in their entirety. One aspect of the above-identified invention will provide a method by which the system will pre-test, rank and assign UWB channels prior to any actual need for an unassigned channel. This will eliminate inefficiencies in channel allocation function and increase system efficiency. By constantly testing, analyzing, prioritizing and assigning a list of available channels, reliable and interference-free UWB communications will be realized.

The present invention discloses techniques used to digitally map and analyze the radio frequency (RF) noise floor specifically for UWB communications. Allocating channels effectively requires prior knowledge of the characteristics of the RF environment upon which the UWB channel will reside. By characterizing the noise that may be present in the time bins that are to be allocated to a channel, a determination can be made of possible interferences that will make that channel less than optimal for data transmission.

Referring to FIG. 1, a schematic diagram of an exemplary UWB communication system 100 capable of utilizing a multiple access scheme in accordance with one embodiment of the present invention is illustrated. One or more wireless mobile units 102 capable of UWB communication communicate with a UWB base station 104. The base station 104 may communicate directly with the dynamic database controller 106, or it may communicate with the radio-frequency (RF) noise sensing antenna 101. The dynamic database controller 106 communicates with the base station 104. The dynamic database controller 106 includes a general computing device for executing its functions and communicates with a noise sampler 108 and a dynamic code database 110.

Figure 2:
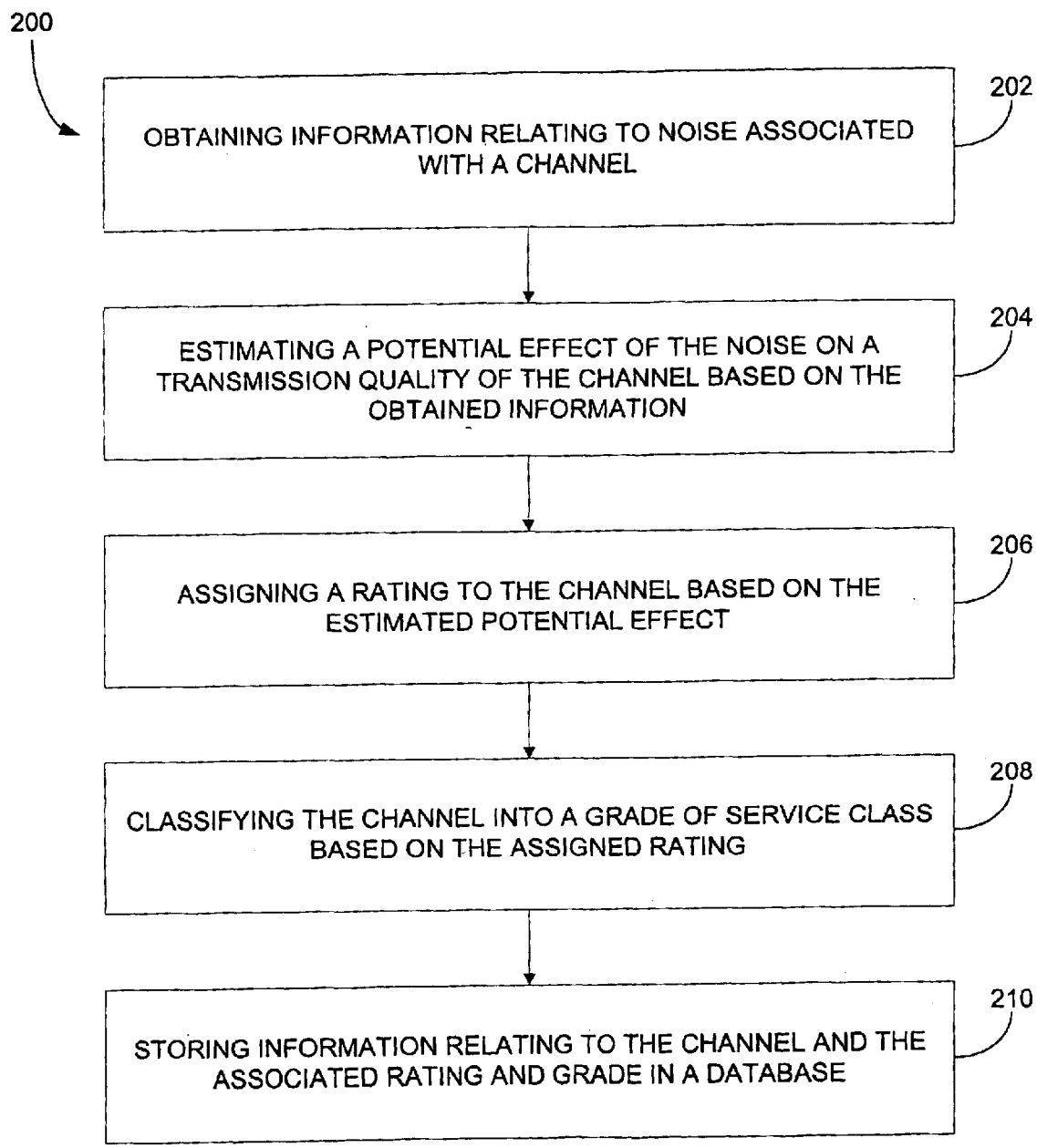
FIG. 2 is a flowchart of a process for managing the transmission suitability of a multiple access channel in a multi access scheme utilizing a dynamic database controller in a communication system such as an ultra-wideband communication system in accordance with an embodiment of the present invention.

FIG. 2 is a flowchart of a process 200 for managing the transmission suitability of a multiple access channel in a multi access scheme utilizing a dynamic database controller 106 in a UWB communication system in accordance with one embodiment of the present invention. It should be understood that the term "channel" used in the present invention may broadly refer to a multiple access scheme channel where multiple access may be achieved by codes, frequency, polarization, phase, etc. In general, information relating to channel noise associated with an unallocated channel is obtained utilizing the noise sampler 108 in operation 202. The noise sampler 108 may employ a RF noise sensing antenna 101. The dynamic database controller 106 then estimates a potential effect of the channel noise on a transmission quality of an unallocated channel based on the obtained information in operation 204. Next in operation 206, a rating is assigned by dynamic database controller 106 the to the unallocated channel based on the estimated potential effect. Based on the assigned rating, the channel is classified into a grade of service class or classification in operation 208. Information relating to the now classified channel and its associated rating and grade of service class is then stored in the database 110 in operation 210.

Figure 3A:
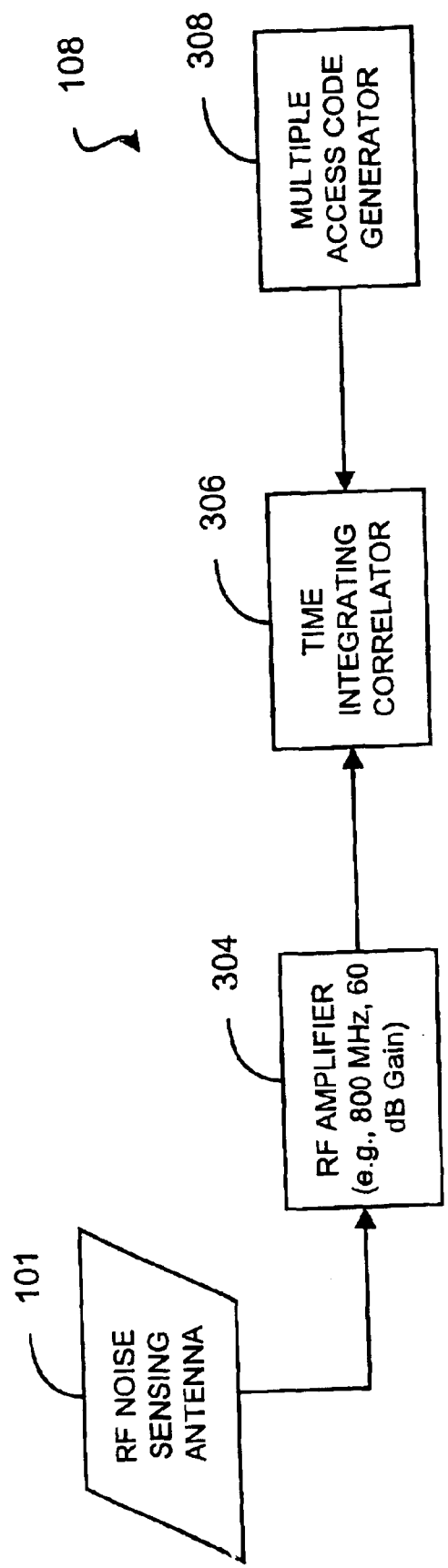
FIG. 3a is a schematic diagram of one embodiment of a RF noise sampler employing a time integrating correlator to correlate the RF noise signal with a UWB communication channel constructed in accordance with an embodiment of the present invention.

In one embodiment of the present invention, the information relating to RF noise associated with a specific channel may be obtained by sampling the RF noise and then correlating the RF noise with the channel. FIG. 3a is a schematic diagram of one embodiment of the noise sampler 108 illustrated in FIG. 1. In this embodiment, a time integrating correlator 306 correlates the RF noise signal with a code sequence. In particular, an RF noise sensing antenna 101 communicates with an RF amplifier 304 which communicates with a time integrating generator 306. The time integrating generator 306 also communicates with a multiple access code generator 308. This embodiment may be suitable for Code Division Multiple Access schemes. Time integrating correlators and code generators for these codes are known in the art. The RF noise samples for this approach may be detected either with the antenna used for data reception or by the dedicated RF noise-sensing antenna 101.

Figure 3B:
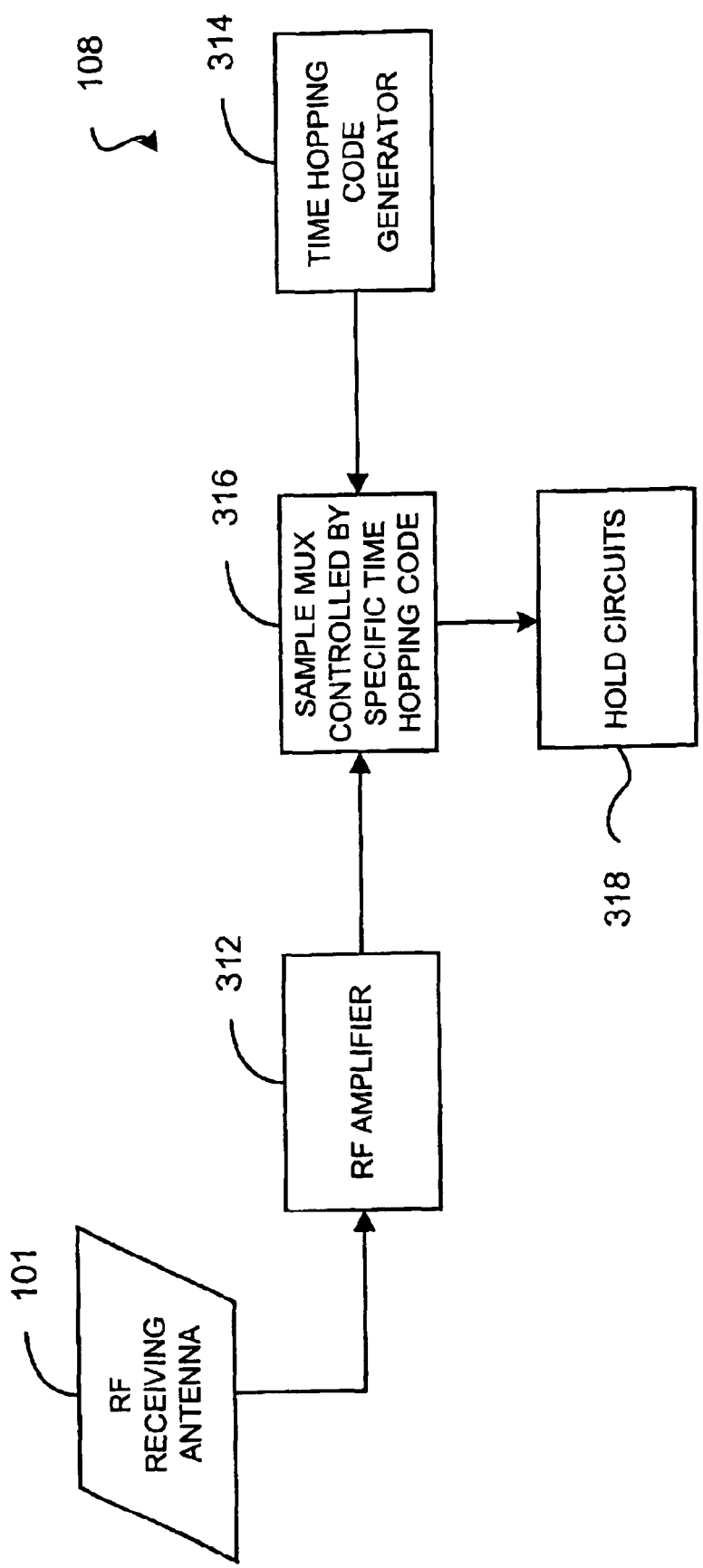
FIG. 3b is a schematic diagram of a RF noise sampler that utilizes real-time sampling of time bins in accordance with a preferred embodiment of the present invention.

FIG. 3b is a schematic diagram of a preferred embodiment noise sampler 108 that utilizes real-time sampling of time windows or "time bins". This noise sampler 108 is based on a different access scheme than the access scheme utilized in FIG. 3a. In particular, a RF receiving antenna 310 is coupled to a RF amplifier 312. The RF amplifier 312 and a Time Hopping code generator 314 are both coupled to a multiplexer (MUX) 316 which, in turn, is coupled to Hold logic 318. In this noise sampler 108, a pseudo-random Time Hopping sequence is used together with a Time Division Multiple Access scheme (TH-TDMA). The RF noise sensing antenna 101 is used to sense the noise present in the time bins to be occupied by a particular unallocated Time Hopping sequence. In order to do this, the Time Hopping sequence is used to control the MUX 316 that allows the input samples to be held and digitized at the appropriate times matching the times that would be allocated to the Time Hopping sequence being tested.

Additional details of the UWB communication system illustrated in FIGS. 1–3b are more fully explained in U.S. patent application, Ser. No. 09/746,348, entitled "Pre-testing and Certification of Multiple Access Codes".

Figure 4:
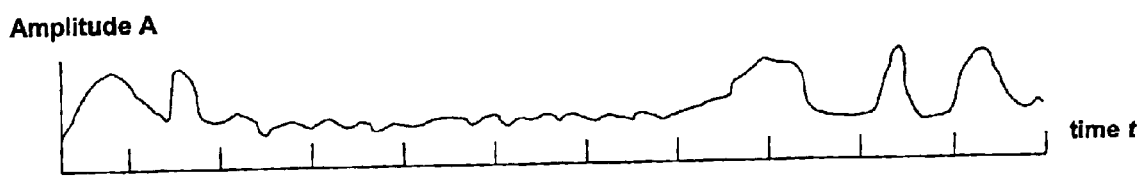
FIG. 4 illustrates a portion of sampled radio-frequency noise data.

FIG. 4 represents a frame of multiple-access data depicting amplitude (A) vs. time (t) and a hypothetical noise signature. In FIG. 4, $f_j$ represents the frame number and $t_i$ represents a time bin within a frame. The index j runs from 0 to N and the index i runs from 0 to n. Time $f_0 t_0$ is the start of frame zero at time zero and is considered an absolute time and subsequent times are referenced relative to it. Time $f_{j+1} t_i - f_j t_i$ is the time period for one data frame. Time $f_j t_{i+1} - f_j t_i$ is considered one time bin. The duration of a time bin may vary from approximately 40 picoseconds to approximately 100 nanoseconds.

The following section describes a number of different embodiments of the present invention that analyze RF noise amplitudes with respect to time. A UWB communication channel constructed according to the present invention comprises a plurality of time bins $t_i$. All RF amplitude sampling of time bins $t_i$ for the following methods can be performed at time $t_i + t_{i+1}/2$, or in other words, the center of the time bin. Other suitable sampling methods can also be performed to obtain a sample of RF noise. Obtaining and analyzing RF noise samples may be performed by a programmable general computing device programmed to perform the described operations. This analysis may be performed by the dynamic database controller 106, the dynamic code database 110, or another suitable device.

The following data sample matrix S represents one sample set of collected RF noise data, each row is one frame of data and each column represents the same time bin $t_i$ in each frame. If N+1 frames are sampled with n time bins in each frame, then the stored matrix is as depicted in S. $A(f_j t_n)$ is the amplitude detected in the center of the last time bin $t_n$ in frame $f_j$:

$$S = \begin{bmatrix} A(f_0 t_0) & A(f_0 t_1) & \ldots & A(f_0 t_n) \\ A(f_1 t_0) & A(f_1 t_1) & \ldots & A(f_1 t_n) \\ \vdots & \vdots & & \\ A(f_{N-1} t_0) & A(f_{N-1} t_1) & \ldots & A(f_{N-1} t_n) \\ A(f_N t_0) & A(f_N t_1) & \ldots & A(f_N t_n) \end{bmatrix}$$

The RF noise data samples will probably contain data from other ultra-wideband devices or other types of noise. For example, impulsive noise such as automobile ignition systems that produce random bursts of nanosecond pulses or other ultra-wideband time pulses may be present. The following embodiments of the present invention analyze RF noise with respect to time to determine the amount and nature of noise present in selected channels. Once the noise in each channel is determined, the channels are ranked based on the amount and type of noise present.

Random noise, also known as additive white Gaussian noise, can be removed through known techniques and a UWB communication channel can be inserted over additive white Gaussian noise. However, RF noise that is systematically increasing or decreasing cannot be removed and will decrease the reliability or otherwise interfere with a UWB channel placed over that noise.

By sampling RF noise data and obtaining the absolute value of the differences between selected data, the nature of the noise can be determined. The absolute value of the difference of selected RF noise data samples can show whether or not the noise is increasing or decreasing. In addition, different embodiments of the invention described below will also determine the average of the noise, the change in the RF noise from one time bin $t_i$ to another time bin $t_i$ and the rate of change of two selected RF noise data samples.

Figure 5:
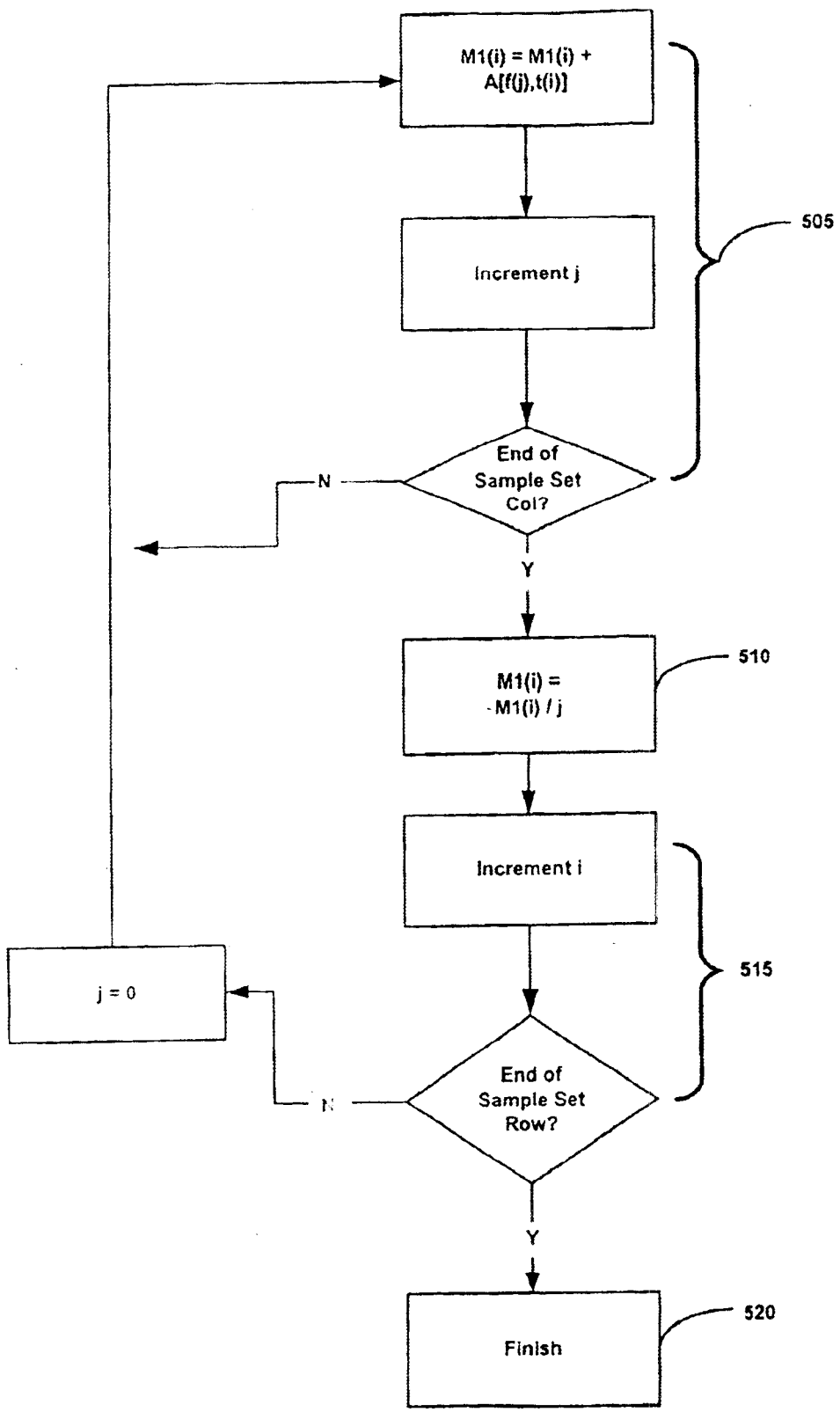
FIG. 5 is a schematic diagram of one method for analyzing RF noise in accordance with one embodiment of the present invention.

Referring to FIG. 5, a sample average of the same time bins $t_i$ over multiple frames $f_j$ of a UWB communication channel constructed according to the present invention will be described. The sample averaging of the same time bins $t_i$ over multiple frames $f_j$ is expressed by the following equation (1):

$$\overline{M1}_i = \frac{1}{N+1}\sum_{j=0}^{N} A(f_j t_i) \quad (1)$$

This equation takes a column-wise average which produces a vector of averages $\overline{M1}_i$. Taking column-wise averages produces the a vector of averages where $A(f_j t_i)$ is equal to the sampled amplitude for a time bin, a pulse slot at time i, in frame j. The number of sample frames is N+1. As shown in FIG. 5, a flowchart illustrates some of the steps a program will perform to analyze the sampled RF noise data. A UWB communication system constructed according to the present invention will employ one or more programs to perform the analysis now discussed. The above equation is performed on matrix S, which contains RF noise data samples. In step 505, the RF noise amplitude found in the same time bin $t_i$ in each frame $f_j$ is summed. In step 510, that sum of RF noise amplitudes is averaged. In step 515, the program moves to the next column representing a second time bin $t_{i+1}$. The sum for the second column is then averaged in step 510, and this process of summing each column representing a distinct time bin $t_i$ is repeated until all of the time bins $t_i$ in all of the frames $f_j$ have been summed and averaged, finishing at step 520.

The resultant average for each time bin $t_i$ represents the average RF noise amplitude for that specific time period. After step 520, the RF noise amplitudes for adjacent time periods can then be evaluated to detect if a periodic signal with a main periodicity of one frame $f_j$ is present. If periodic noise is present, an estimation of the effect of the noise on the transmission quality is performed by the dynamic database controller 106, illustrated in FIG. 2.

Figure 6:
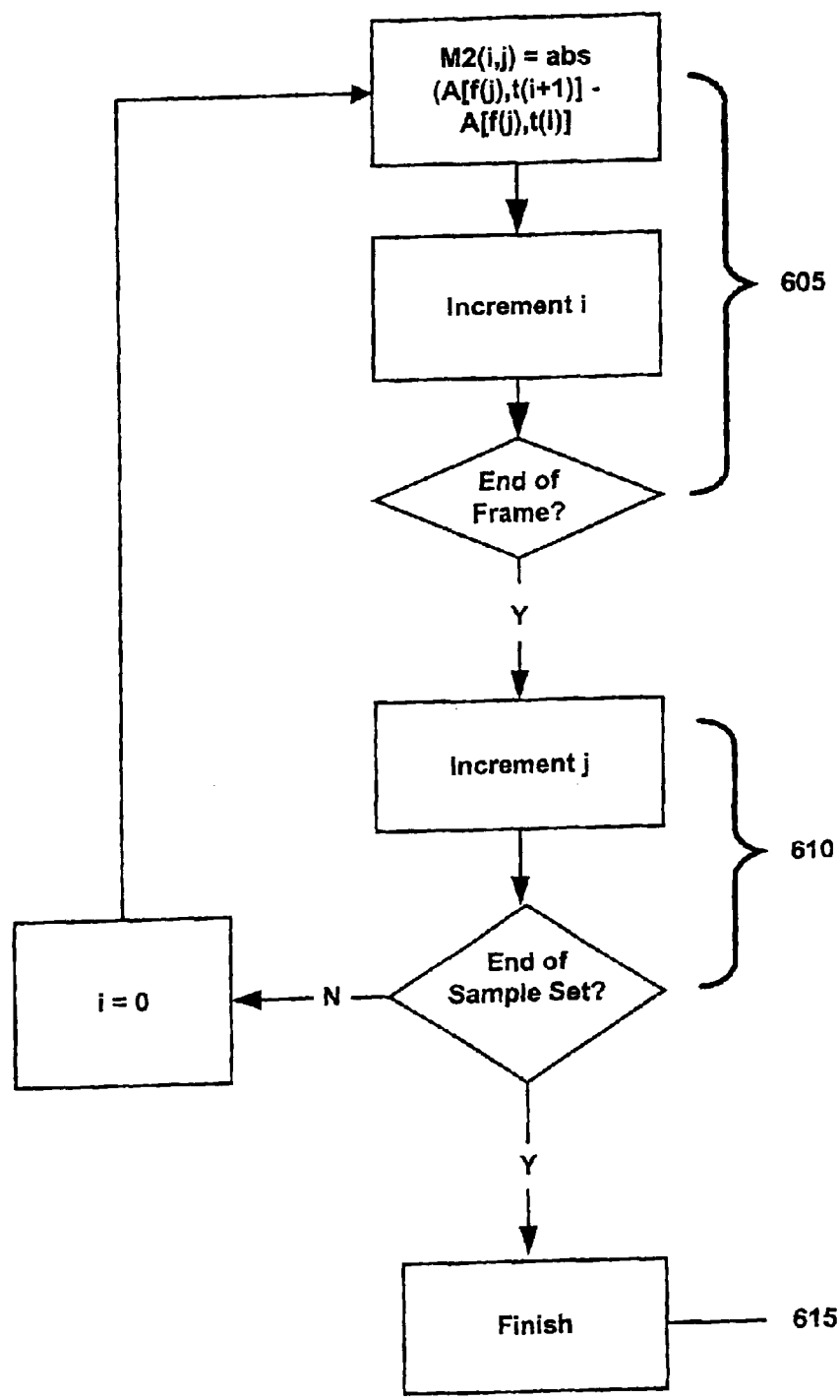
FIG. 6 is a schematic diagram of another process for analyzing RF noise in accordance with another embodiment of the present invention.

Referring to FIG. 6, another process according to the present invention is illustrated which evaluates the RF noise amplitude data. The process illustrated in FIG. 6 takes a first difference of adjacent time bins $t_i$ within a frame $f_j$. This is expressed by the following equation (2):

$$M2_{ij} = |A(f_j t_{i+1}) - A(f_j t_i)| \quad (2)$$

In step 605, the difference of the amplitudes of RF noise samples in adjacent time bins $t_i$ in the same frame $f_j$ is taken. This process is repeated in step 605 until all of the adjacent time bins $t_i$ in one frame $f_j$ have been evaluated. In step 610, when the end of the frame is reached, the next frame $f_{j+1}$ is analyzed according to step 605. In this manner, all of the adjacent time bins $t_i$ in a plurality of frames $f_j$ are evaluated. This first difference calculation $M2_{ij}$ obtains the difference in RF noise amplitudes in adjacent time bins $t_i$ within a frame $f_j$. At step 615, when all of the RF noise samples have been analyzed, this information can be used to determine if the RF noise is increasing or decreasing with time by the dynamic database controller 106.

Alternatively, the data obtained by equation (1) can be used to obtain the absolute value of a difference of adjacent time bin $t_i$ RF noise amplitude averages. This process is expressed by the following equation (3):

$$\overline{M2}_i = |\overline{M1}_{i+1} - \overline{M1}_i| \quad (3)$$

In equation (3), an absolute value of the difference between averaged RF noise samples in adjacent time bins $t_i$ is obtained. The data obtained after this analysis will be used by the dynamic database controller 106, or other suitable device to determine the change in RF noise amplitudes in adjacent time bins $t_i$.

Figure 7:
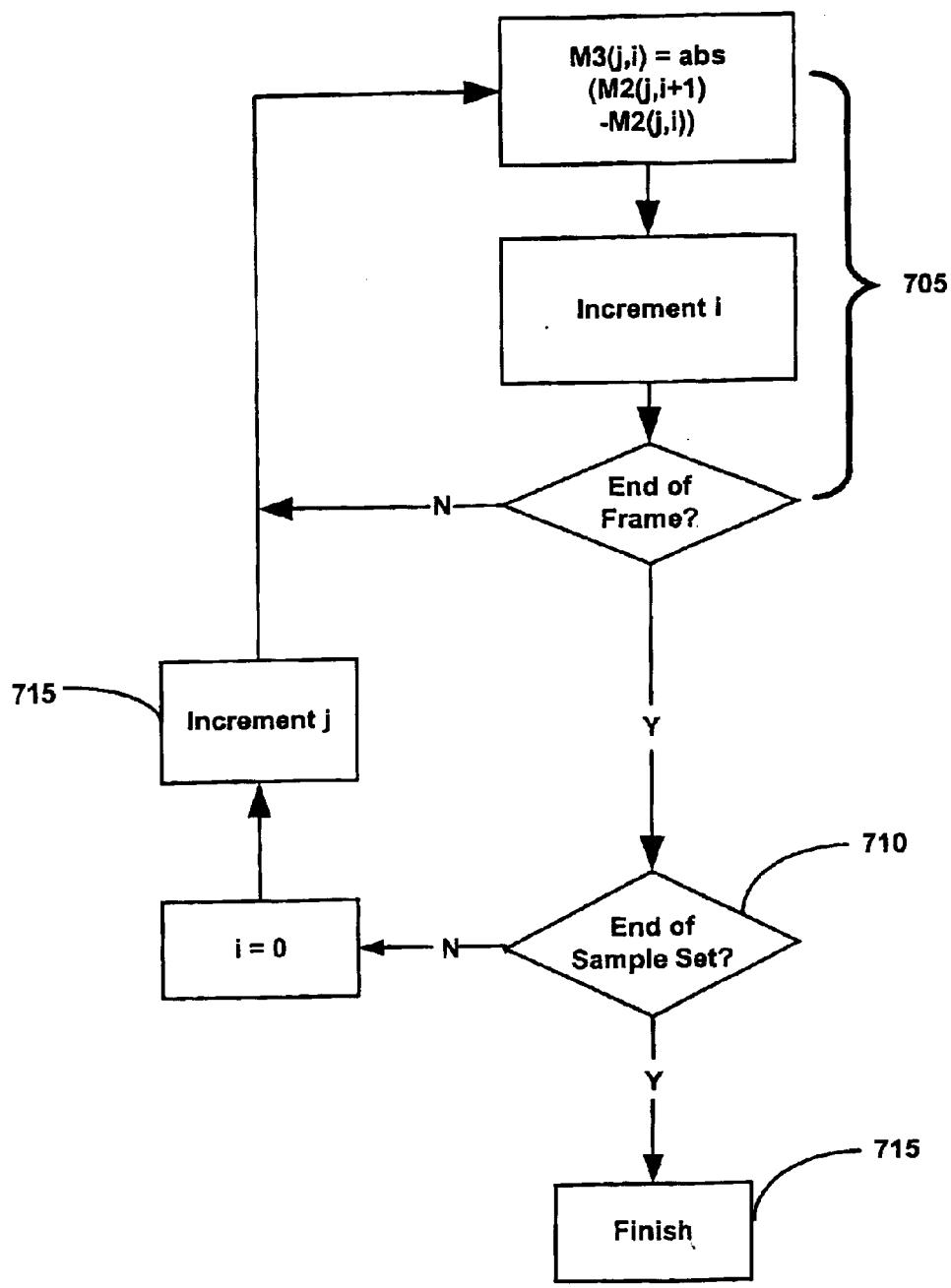
FIG. 7 is a schematic diagram of another method for analyzing RF noise in accordance with another embodiment of the present invention.

Referring to FIG. 7, a process to obtain a second difference of adjacent time bins $t_i$ is illustrated. This process uses the data obtained from equation (2). The process illustrated in FIG. 7 takes a second difference of adjacent time bins $t_i$ within a frame $f_j$. This is expressed by the following equation (4):

$$M3_{ij} = |M2_{i+1} - M2_i| \quad (4)$$

In step 705, the absolute value of the difference of the change in adjacent time bins $t_i$ in the same frame $f_j$ is obtained. This process is repeated in step 705 until all of the adjacent time bins $t_i$ in one frame $f_j$ have been evaluated. In step 710, when the end of the frame is reached, the next frame $f_j$ is analyzed according to step 705. In this manner, all of the adjacent time bins $t_i$ and a plurality of frames $f_j$ are evaluated. This second difference calculation $M3_{ij}$ obtains the second difference of RF noise amplitudes of adjacent time bins $t_i$ within a frame $f_j$. At step 715, when all of the RF noise samples have been analyzed, this information can be used to determine the rate of change of the RF noise by the dynamic database controller 106, or other suitable devices. The rate of change of the RF noise can help to determine the quality of a channel and can also be used to estimate a potential effect of the noise on a transmission.

Alternatively, the data obtained by equation (3) can be used to obtain the absolute value of a second difference of adjacent time bin $t_i$ RF noise amplitude averages. This process is expressed in the following equation (5):

$$\overline{M3}_i = |\overline{M2}_{i+1} - \overline{M2}_i| \quad (5)$$

In equation (5), an absolute value of the second difference between averaged RF noise samples in adjacent time bins $t_i$ is obtained. This data is used by the dynamic database controller 106, or other suitable device to determine the rate of change, or how fast the RF noise amplitudes in adjacent time bins $t_i$ is changing.

Figure 8:
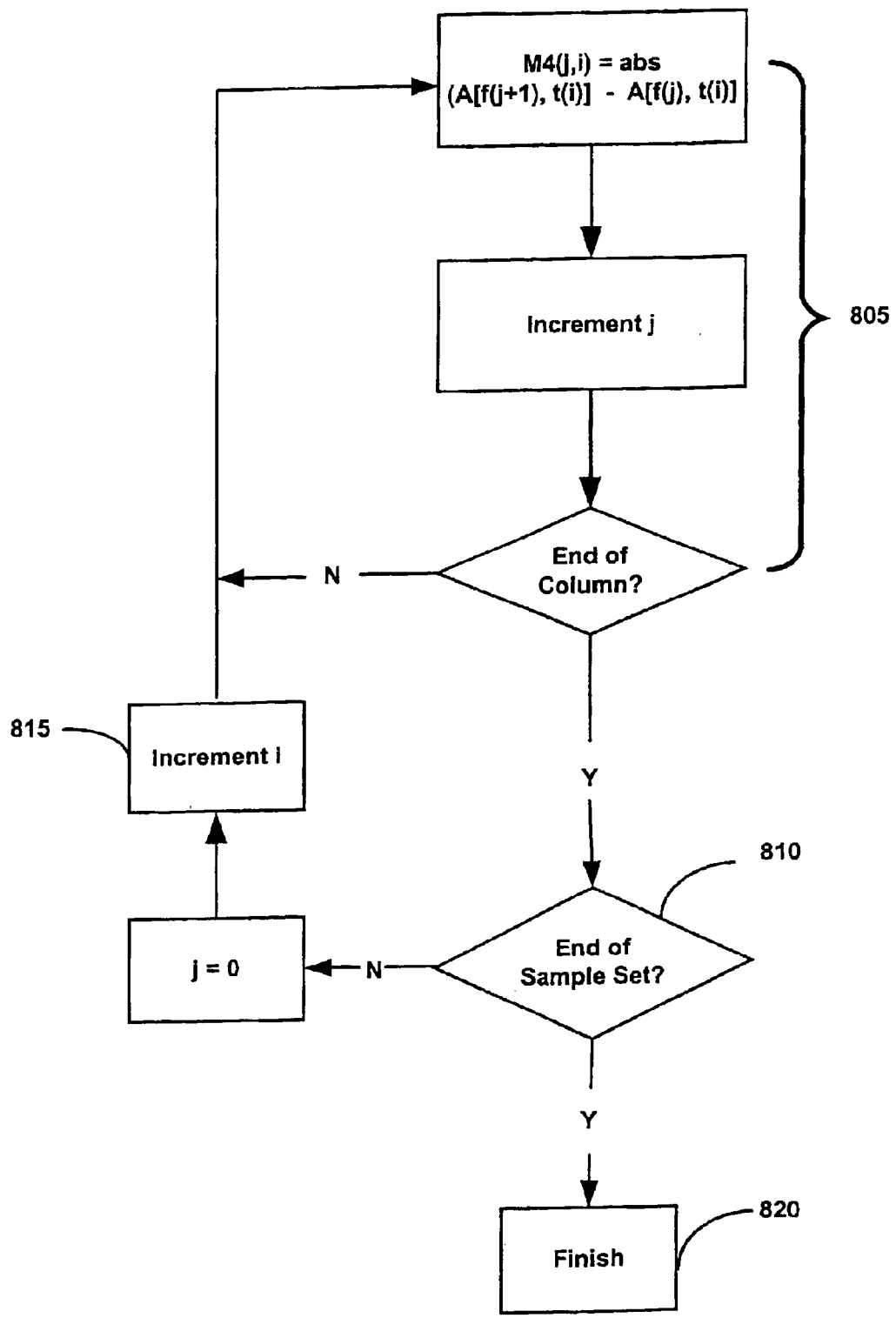
FIG. 8 is a schematic diagram of another method for analyzing RF noise in accordance with another embodiment of the present invention.

Referring to FIG. 8, an alternative process for evaluating the RF noise amplitude in a data sample for use in an UWB communication system constructed according to the present invention is illustrated. Referring to FIG. 8, a first difference of the same time bins $t_i$ over multiple frames $f_j$ is obtained. This is expressed by the following equation (6):

$$M4_{ji} = |A(f_{j+1} t_i) - A(f_j t_i)| \quad (6)$$

This process uses sampled RF amplitude data from two consecutive frames $f_j$ contained in the matrix S, defined above. This is illustrated in step 805 of FIG. 8 where the absolute value of the difference between the same time bin $t_i$ in adjacent frames $f_j$ is calculated. In step 810, the difference of adjacent time bins $t_i$ is repeated until all of the frames $f_j$ have been evaluated. When the last frame $f_j$ has been evaluated, the program continues by moving to the next time bin $t_i$ in step 815. In this manner, all time bins $t_i$ in a sample of RF noise amplitude data is evaluated.

This process obtains a change in the RF noise amplitude in corresponding time bins $t_i$ across successive frames $f_j$. At step 820, the process is complete, and the dynamic database controller 106 conducts an analysis of whether or not a detected RF noise may be repetitive. If a repetitive RF noise is found through this analysis, it can be avoided thereby improving the quality and reliability of UWB communications performed according to the present invention.

Figure 9:
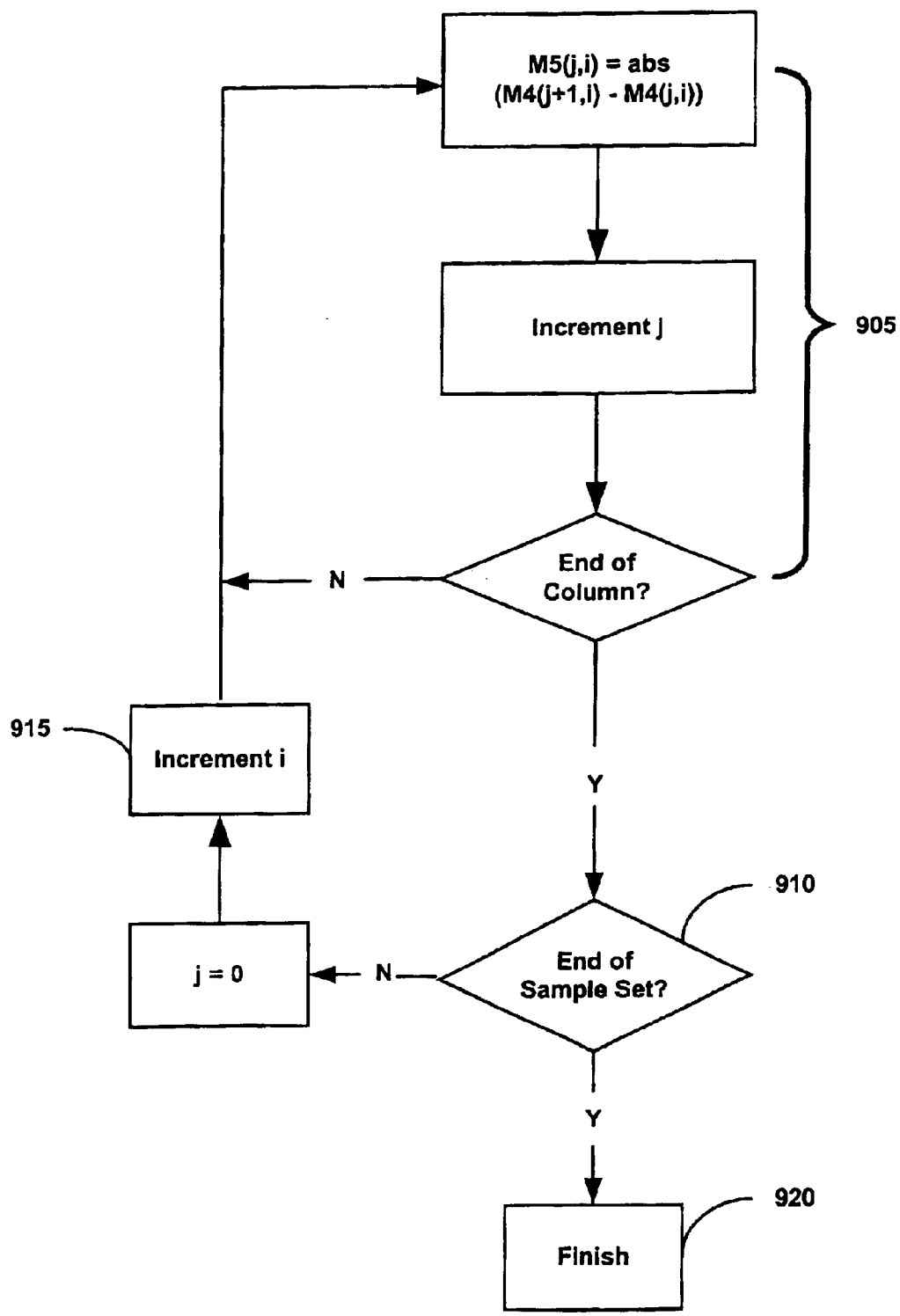
FIG. 9 is a schematic diagram of another embodiment for analyzing RF noise in accordance with another embodiment of the present invention.

Referring to FIG. 9, a process to obtain a second difference of the same time bin $t_i$ over multiple frames $f_j$ is illustrated. This process is expressed by the following equation (7):

$$M5_{ji} = |M4_{i+1} - M4_i| \qquad (7)$$

In the above equation, the rate of change of the RF noise amplitude in corresponding time bins $t_i$ across successive frames $f_j$ is determined. In step 905, the absolute value of the difference of the change in the same time bins $t_i$ across multiple frames $f_j$ is obtained. In step 910, when the end of a column of frames $f_j$ is reached, the program increments to the next time bin $t_i$ in step 915. This process is repeated until all of the differences of the same time bins $t_i$ are obtained for all frames $f_j$. In step 920, the process is complete, and the dynamic database controller 106 uses this information to determine the rate of change of the RF noise amplitude data in corresponding time bins $t_i$. The rate of change information can help to determine the characteristic of the RF noise amplitudes in specific time bins $t_i$.

Figure 10:
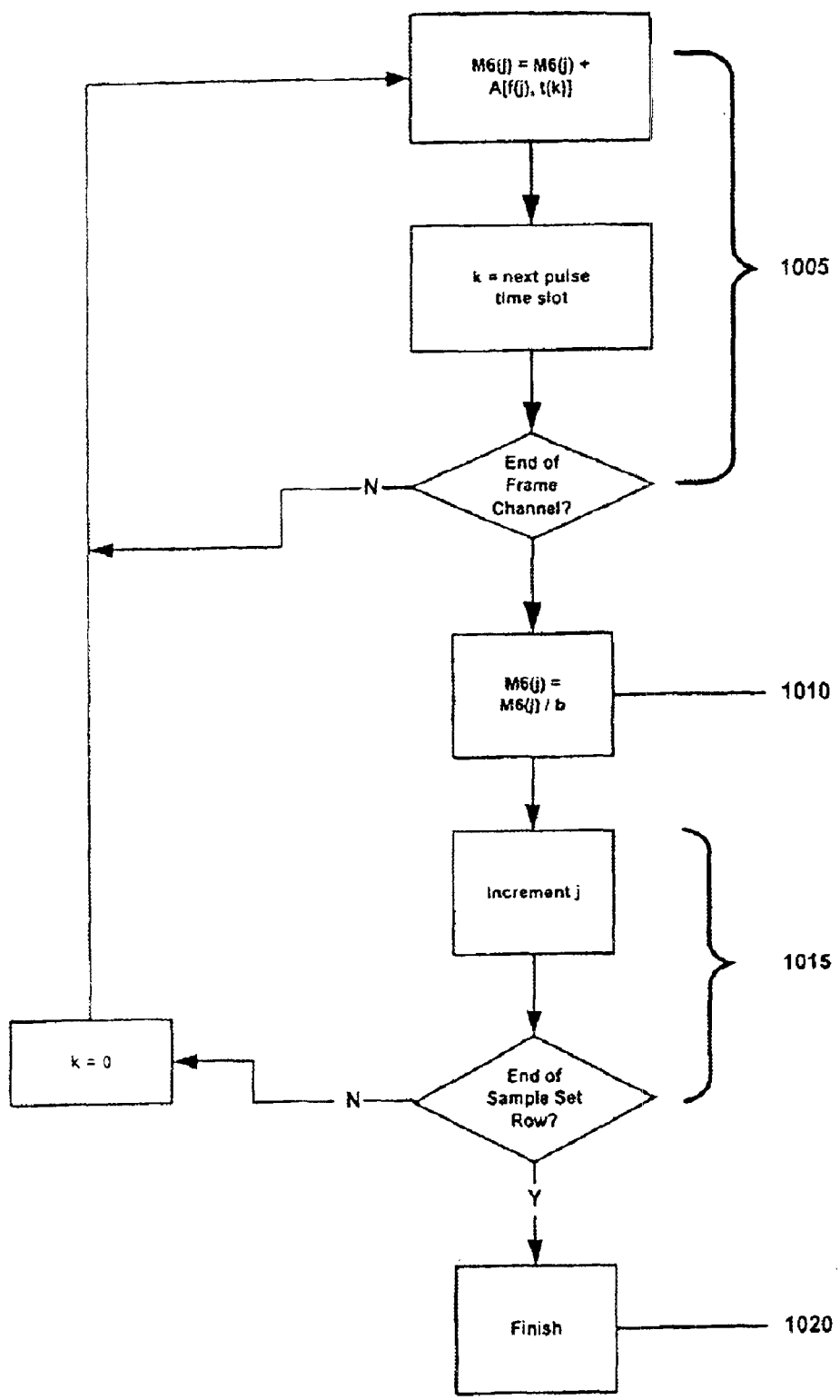
FIG. 10 is a schematic diagram of another embodiment for analyzing RF noise in accordance with another embodiment of the present invention.
Figure 11:
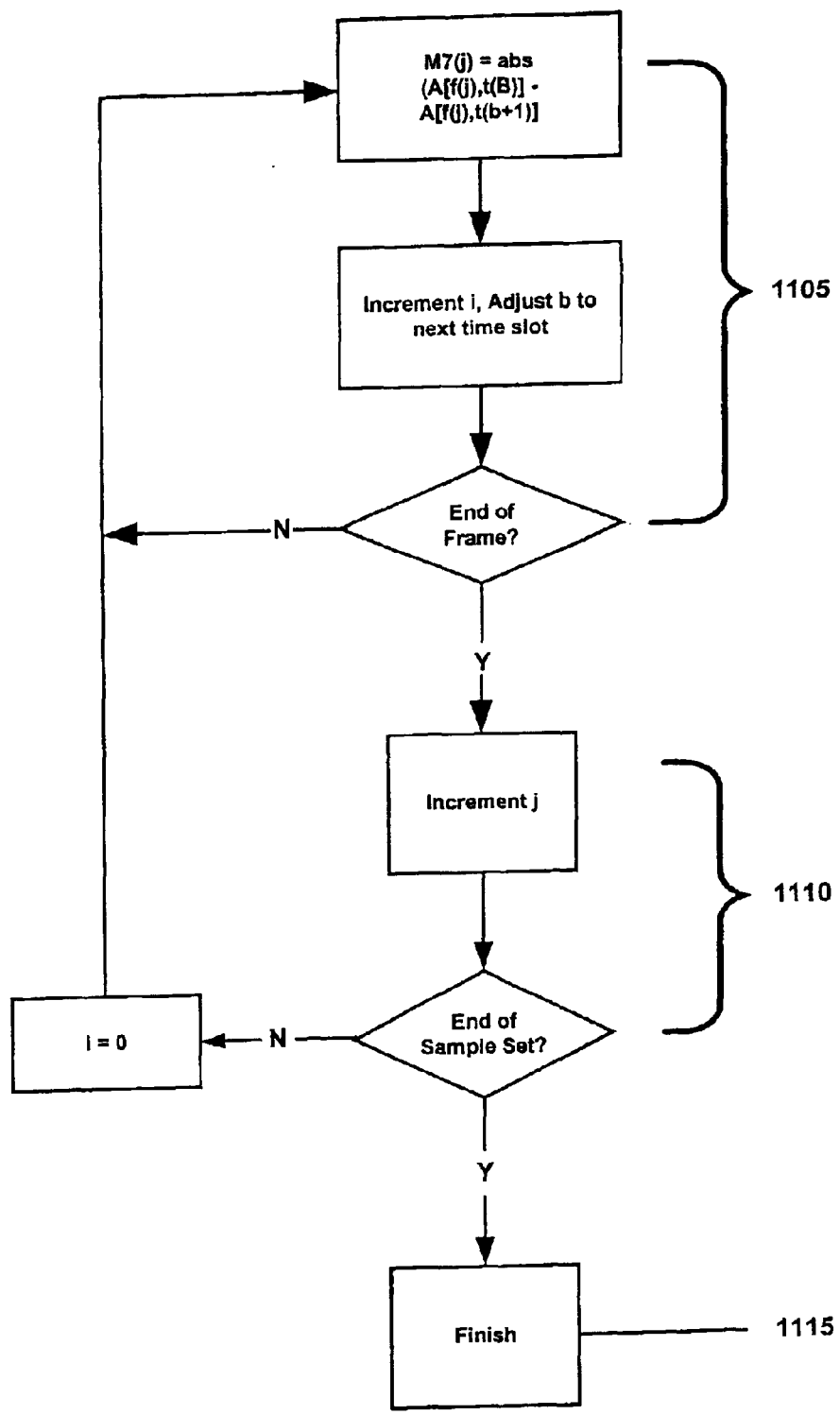
FIG. 11 is a schematic diagram of another method for analyzing RF noise in accordance with another embodiment of the present invention.
Figure 12:
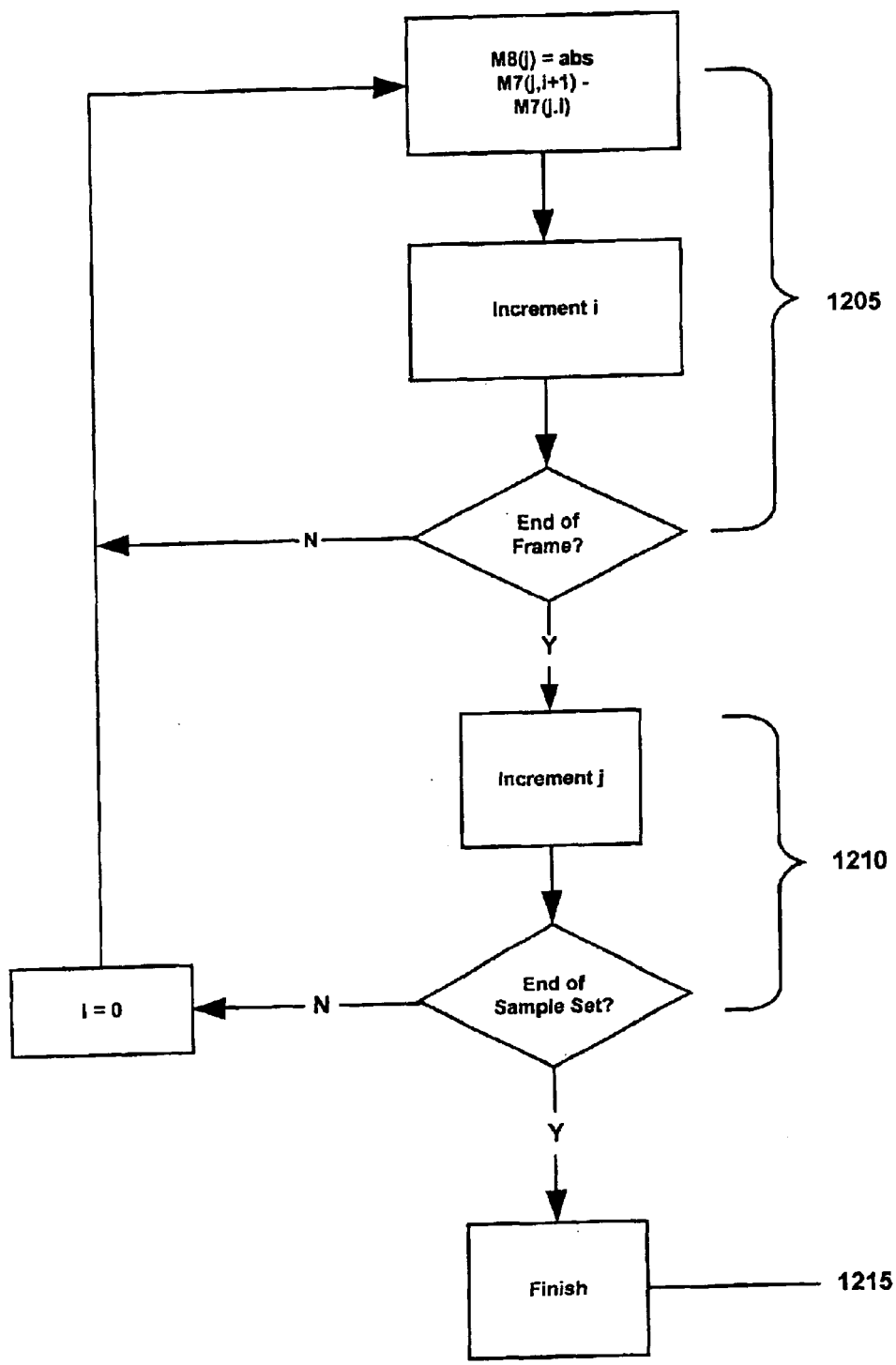
FIG. 12 is a schematic diagram of another method for analyzing RF noise in accordance with another embodiment of the present invention.

Referring to FIGS. 10–12, a preferred embodiment of the present invention is illustrated. Shown in FIGS. 10–12 are processes used to examine RF noise amplitude in pseudo-randomly spaced time bins. As discussed in prior sections, pseudo-random distribution of time bins is accomplished through "time-hopping". In a preferred embodiment of the invention, a plurality of pseudo-randomly spaced time bins are selected and allocated to a specific channel. In this manner, a plurality of channels each comprising a plurality of time bins that do not overlap can be transmitted simultaneously. The number of time bins in each channel is determined according to the bandwidth requirement for the type of information communicated in that channel. As discussed above, the plurality of pseudo-randomly spaced time bins are located within a frame f. The number of channels possible in a frame is determined according to the following equation: possible channels=(int) N/b. That is, the number of possible channels equals the integer portion of the quotient of the number of time bins available per frame divided by the desired time bins per channel per frame.

Referring to FIG. 10, a process to obtain sample average of a single channel comprising a plurality of time bins $t_k$ located in multiple frames $f_j$ is illustrated. The sample averaging of the plurality of frames $f_j$ and time bins $t_i$ is expressed by the following equation (8):

$$\overline{M6}_j = \frac{1}{N+1} \sum_{j=0}^{N} \sum_{k=1}^{b} A(f_j t_k) \qquad (8)$$

In the above equation, $f_j$ is equal to frame j, $t_k$ is the $k^{th}$ time bin allocated to the same channel and frame $f_j$, k is a frame-periodic pseudo-noise sequence of length b and N is the number of frames over which the sequence is averaged. Illustrated in FIG. 10 is a flowchart illustrating the steps a program will perform to analyze sampled RF noise data.

The following data sample matrix T is used by equation (8). Matrix T represents one sample set of collected RF noise data, wherein each row is one frame of data and each column represents a pseudo-randomly placed time bin t. If N+1 frames are sampled with b time bins in each frame, then the stored matrix is as depicted in T. $A(f_j t_b)$ is the amplitude detected in the center of the time bins $t_b$ in frame $f_j$:

$$T = \begin{bmatrix} A(f_0 t_0) & A(f_0 t_1) & \ldots & A(f_0 t_b) \\ A(f_1 t_0) & A(f_1 t_1) & \ldots & A(f_1 t_b) \\ \vdots & \vdots & & \\ A(f_{N-1} t_0) & A(f_{N-1} t_1) & \ldots & A(f_{N-1} t_b) \\ A(f_N t_0) & A(f_N t_1) & \ldots & A(f_N t_b) \end{bmatrix}$$

In step 1010, the RF noise amplitude found in the same pseudo-randomly placed time bin $t_b$ in each frame $f_j$ is summed. In step 1010, that sum of RF noise amplitudes is averaged. In step 1015, the program moves to the next column representing a second pseudo-randomly placed time bin $t_b$. The sum for the second column is then averaged in step 1010, and this process of summing each column representing a pseudo-randomly placed time bin $t_b$ is repeated until all of the pseudo-randomly placed time bins $t_b$ in all of the frames $f_j$ have been summed and averaged, finishing at step 1020. The resultant average for each pseudo-randomly placed time bin $t_b$ represents the average RF noise amplitude for that specific channel to which the pseudo-randomly placed time bins $t_b$ have been allocated. After step 1020, the RF noise amplitudes for the specific channel can then be evaluated to detect if a periodic signal or other types of RF noise is present. If RF noise is present, an estimation of the effect of the noise on the transmission quality is performed by the dynamic database controller 106, illustrated in FIG. 2. Additionally, the data obtained from the process illustrated in FIG. 10 can be used to rank channel quality based on the RF noise present in that UWB communication channel.

Referring to FIG. 11, another process according to the present invention is illustrated which evaluates the RF noise amplitude data. The process illustrated in FIG. 11 takes a first difference of pseudo-randomly placed time bins $t_b$ within a frame $f_j$. This is expressed by the following equation (9):

$$M7_j = |A(f_j t_l) - A(f_j t_k)|, \qquad (9)$$

where $t_l$ is the pseudo-randomly placed time bin that follows $t_k$ in the pseudo-randomly placed sequence allocated to a specific UWB communication channel. That is, $t_l$ is not the temporally next time bin but instead is the time bin that next follows $t_k$ in a sequence of pseudo-randomly placed time bins. In step 1105, the difference of the amplitudes of RF noise samples in pseudo-randomly placed time bins $t_b$ in the same frame $f_j$ is taken. This process is repeated until all of the pseudo-randomly placed time bins $t_j$ allocated to a specific channel in one frame $f_j$ have been evaluated. In step 1110, when the end of the frame $f_j$ is reached, the next frame $f_j$ is analyzed according to step 1105. In this manner, all of the pseudo-randomly placed time bins $t_b$ in a plurality of frames $f_j$ are evaluated. This first difference calculation $M7_j$ obtains the difference in RF noise amplitudes in sequential pseudo-randomly placed time bins within a frame. At step 1115, when all of the RF noise samples have been analyzed, this information may be used to determine if the RF noise is increasing or decreasing in the specific UWB communication channel that has been allocated to those sampled pseudo-randomly placed time bins $t_b$. Alternatively, the data obtained by equation (8) can be used to obtain the absolute value of a difference of the RF noise amplitude averages in channel adjacent pseudo-randomly placed time bins $t_b$. This process is expressed by the following equation (10):

$$\overline{M7}_j = |\overline{M6}_l - \overline{M6}_k| \qquad (10)$$

In equation (10), an absolute value of the difference between averaged RF noise samples in channel adjacent pseudo-randomly placed time bins $t_b$ is obtained. $M6_l$, is the time bin that follows $M6_k$ in a sequence of pseudo-randomly placed time bins allocated to a specific UWB communication channel. These time bins are referred to as "channel adjacent" time bins. The data obtained after this analysis will be used by the dynamic database controller 106, or other suitable device to determine the change in RF noise amplitudes in a UWB communication channel that has been allocated specific pseudo-randomly placed time bins.

Referring to FIG. 12, a process to obtain a second difference of pseudo-random time bins $t_b$ is illustrated. This process uses the data obtained from equation (10). The process illustrated in FIG. 12 takes a second difference of channel adjacent pseudo-randomly placed time bins $t_b$ within a frame $f_j$. This is expressed by the following equation (11):

$$M8_j = |M7_l - M7_k| \qquad (11)$$

Again, $M7_l$ is the time bin that follows $M7_k$ in a sequence of pseudo-randomly placed time bins allocated to a specific UWB communication channel.

In step 1205, the absolute value of the difference of the change in channel adjacent pseudo-randomly placed time bins $t_b$ in the same frame $f_j$ is obtained. This process is repeated in step 1205 until all of the data from equation (10) has been evaluated. In step 1210, when the end of the frame $f_j$ is reached, the next frame $f_j$ is analyzed according to step 1205. In this manner, all of the data from equation (10) is evaluated. This second difference calculation $M8_j$ obtains the second difference of RF noise amplitudes of channel adjacent time bins $t_b$ within a frame $f_j$. At step 1215, when all of the RF noise samples have been analyzed, this information may be used to determine the quality of a channel which will later be used in the process for ranking channels to be described below.

Alternatively, the data obtained by equation (10) can be used to obtain the absolute value of a second difference of channel adjacent time bin $t_b$ RF noise amplitude averages. This process is expressed in the following equation (12):

$$\overline{M8}_j = |\overline{M7}_l - \overline{M7}_k| \qquad (12)$$

In equation (12) an absolute value of the second difference between averaged RF noise samples in channel adjacent time bins $t_b$ is obtained. This data is used by the dynamic database controller 106, or other suitable device to determine the rate of change, or how fast the RF noise amplitudes in adjacent pseudo-random time bins $t_b$ is changing.

The above-described methods and processes are used to obtain and manipulate data used for evaluating RF noise amplitudes that may be present during transmission of a UWB communication channel constructed according to the present invention. The above-described methods quantify the type of RF noise that may be present. For example, narrow duration noise, wide duration noise, additive white Gaussian noise, repetitive noise, and other types of RF noise can all be evaluated using the above-described methods. This information is used to grade or rank each UWB channel that is to be transmitted. In one embodiment of the present invention, time bins will be created to correspond with each UWB channel's statistical probability for optimum suitability in descending order from channels of highest quality to channels of lowest quality. For example, a channel assigned for the transmission of data which requires high transmission rates would receive a high quality channel containing low or non-existent amounts of RF noise. A UWB channel assigned to carry video data may receive a slightly lower quality channel that has slightly higher amounts of RF noise present. A UWB channel for transmitting audio signals may receive a low quality channel containing high amounts of RF noise, and some UWB channels may not be allocated any data because analysis has indicated that the RF noise present is too great to carry any data reliably.

The information derived from the above-described methods may be used to grade and assign each channel into time bins identified for optimum channel bandwidth. Time bins will ideally be created to correspond to each channel's statistical probability for optimum suitability in descending order from Data (channels of highest quality), Video (next highest quality), Audio (lowest quality) and "Not Suitable" (channel quality is not suitable for pulse train insertion).

The reliability of a UWB communication channel constructed according to the present invention can be evaluated by determining the projected bit error rate (PBER). One process for evaluating a PBER in a UWB channel constructed according to the present invention is expressed in the following equation (13):

$$PBER = -\frac{\ln(1-CL)}{n} + \frac{\ln\left(\sum_{k=0}^{N} \frac{(n \cdot PBER)^k}{k!}\right)}{n} \qquad (13)$$

where n is the number of bits transmitted in an ultra-wideband communication channel, and CL is the confidence level (that is, the statistical confidence that the bit error rate (BER) will be less than or equal to the PBER). N is the total number of bit errors that occur during the transmission, and k refers to the $k^{th}$ bit error. This equation can be solved by iterative methods by inserting CL, and yields a PBER that is constantly updated as a transmission proceeds. For example, a CL of 0.95 can be inserted into the equation and a PBER can be determined. As the PBER changes, the amount of data transmitted may be decreased to maintain channel quality or the data transmission on that specific channel may be terminated and switched to another ultra-wideband channel with a lower PBER.

Figure 13:
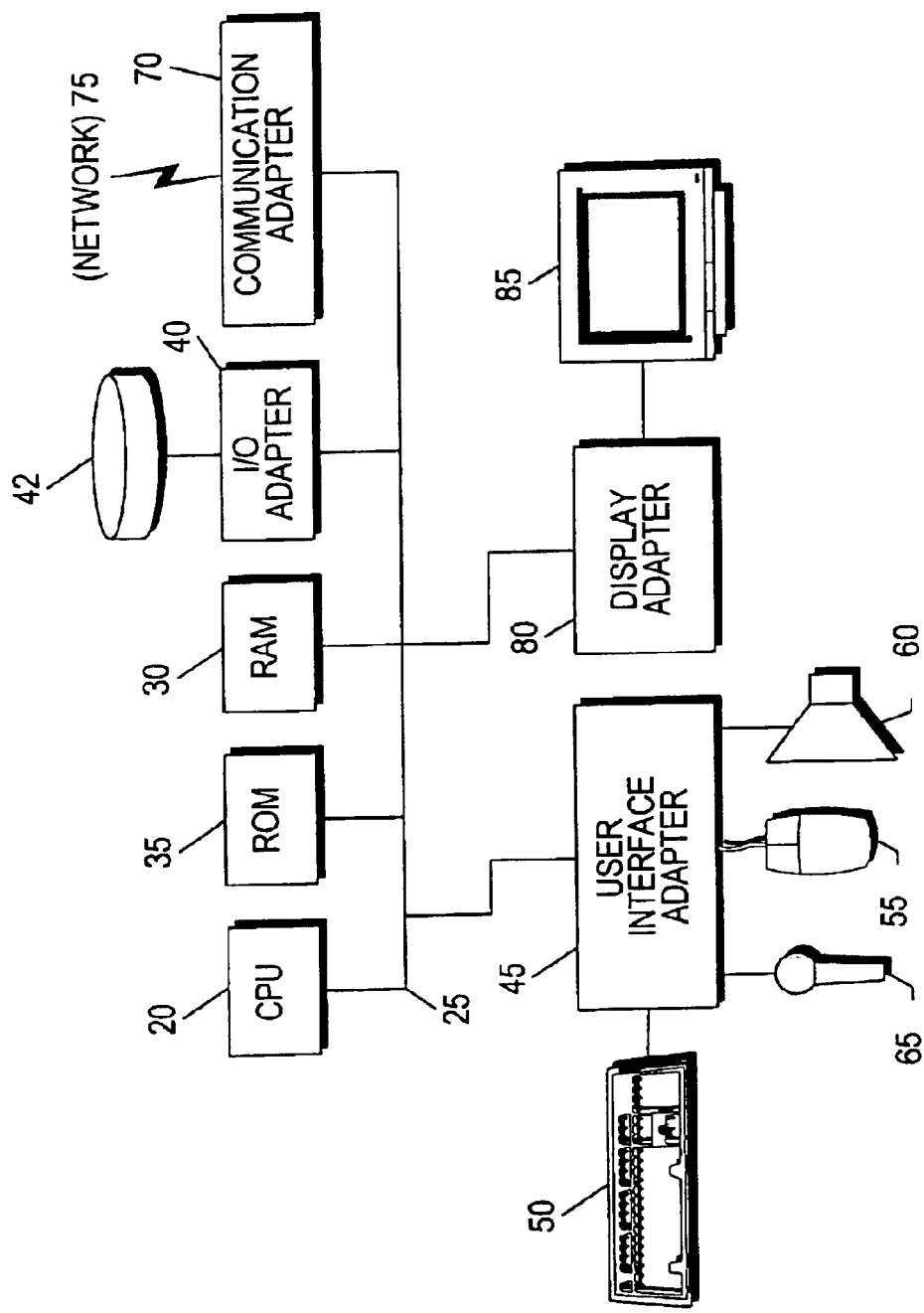
FIG. 13 is a schematic diagram of a representative hardware environment in accordance with an embodiment of the present invention.

FIG. 13 illustrates a representative hardware environment or workstation by which embodiments of the present invention may be carried out. In the present invention, the various sub-components of each of the components embodying the invention may also be considered components of the UWB communication system. For example, particular software modules executed on any component of the system may also be considered components of the system. The hardware configuration illustrated in FIG. 13 includes a central processing unit 20, such as a microprocessor, and a number of other units interconnected via a system bus 25.

The workstation shown in FIG. 13 includes a Random Access Memory (RAM) 30, Read Only Memory (ROM) 35, an I/O adapter 40 for connecting peripheral devices such as disk storage units 42 to the bus 25, a user interface adapter 45 for connecting a keyboard 50, a mouse 55, a speaker 60, a microphone 65, and/or other user interface devices such as a touch screen (not shown) to the bus 25, communication adapter 70 for connecting the workstation to a communication network 75 (e.g., a data processing network) and a display adapter 80 for connecting the bus 25 to a display device 85.

An embodiment of the present invention may be written using JAVA, C, C++, or other suitable computer languages and may utilize object oriented programming methodology.

Thus, it is seen that an apparatus and method for mapping RF noise in a UWB communication system is provided. One skilled in the art will appreciate that the present invention can be practiced by other than the preferred embodiments, which are presented in this description for purposes of illustration and not of limitation, and the present invention is limited only by the claims that follow. It is noted that various equivalents for the particular embodiments discussed in this description may practice the invention as well.

What is claimed is:

1. A method for mapping radio-frequency noise comprising the steps of:
   providing a frame containing radio-frequency amplitude data, the frame comprising a plurality of time bins;
   sampling radio-frequency amplitude data from the frame;
   identifying a plurality of corresponding time bins in the frame;
   averaging the radio-frequency amplitude data in the corresponding time bins;
   determining an absolute value of a difference from adjacent time bin radio-frequency amplitude averages, thereby obtaining a change in adjacent time bin radio-frequency amplitude averages; and
   determining an absolute value of a difference of the change in adjacent time bin radio-frequency amplitude averages, thereby obtaining a rate of change in adjacent time bin radio-frequency amplitude averages.

2. The method for mapping radio-frequency noise of claim 1, wherein the sampled radio-frequency amplitude data is stored in matrix form, and a plurality of frames are sampled, so that each frame comprises a row, and the corresponding time bins comprise one or more columns.

3. The method for digitally mapping radio-frequency noise of claim 2, wherein the matrix comprises:

$$S = \begin{bmatrix} A(f_0 t_0) & A(f_0 t_1) & \ldots & A(f_0 t_n) \\ A(f_1 t_0) & A(f_1 t_1) & \ldots & A(f_1 t_n) \\ \vdots & & & \\ A(f_{N-1} t_0) & A(f_{N-1} t_1) & \ldots & A(f_{N-1} t_n) \\ A(f_N t_0) & A(f_N t_1) & \ldots & A(f_N t_n) \end{bmatrix}$$

where matrix S contains a plurality of radio-frequency amplitude data samples, A is a discrete radio-frequency amplitude sample, f represents the frame number and t represents the time bin of the discrete radio frequency amplitude sample.

4. The method for digitally mapping radio-frequency noise of claim 3, wherein averaging the radio-frequency amplitude samples A in corresponding time bins $t_i$ from the plurality of frames $f_j$ is performed by taking column-wise averages of matrix S according to the following equation:

$$\overline{M1}_i = \frac{1}{N+1} \sum_{j=0}^{N} A(f_j t_i),$$

thereby obtaining a plurality of radio-frequency amplitude averages $\overline{M1}$ of the corresponding time bins $t_i$ of each frame $f_j$.

5. The method for digitally mapping radio-frequency noise of claim 4, wherein determining an absolute value of a difference from adjacent time bin radio-frequency amplitude averages $\overline{M2}_i$ is performed according to the following equation:

$$\overline{M2}_i = |\overline{M1}_{i+1} - \overline{M1}_i|,$$

where $\overline{M1}_i$ is obtained from claim 4.

6. The method for digitally mapping radio-frequency noise of claim 5, wherein determining an absolute value of a difference of the change in adjacent time bin radio-frequency amplitude averages $\overline{M3}_i$ is performed according to the following equation:

$$\overline{M3}_i = |\overline{M2}_{i+1} - \overline{M2}_i|,$$

where $M2_i$ is obtained from claim 5.

7. The method for mapping radio-frequency noise of claim 1, further including the step of:
   ranking the radio-frequency noise by evaluating one or more of:
   the plurality of radio-frequency amplitude averages of the corresponding time bins of each frame;
   the change in adjacent time bin radio-frequency amplitude averages; and
   the rate of change in adjacent time bin radio-frequency amplitude averages.

8. The method for mapping radio-frequency noise of claim 1, further including the step of:
   assigning a data transmission rate to one or more UWB communication channels, each UWB communication channel comprising a plurality of time bins.

9. The method for mapping radio-frequency noise of claim 8, wherein the data transmission rate for each UWB communication channel is based on the radio-frequency noise present in the channel time bins.

10. The method for mapping radio-frequency noise of claim 1, wherein a time period of each frame varies with a number of UWB communication channels present in the frame.

11. The method for mapping radio-frequency noise of claim 1, further including the step of inserting time bins into a frame to avoid detected radio-frequency noise.

12. The method for mapping radio-frequency noise of claim 1, wherein a duration of a time bin can range from about 40 picoseconds to about 100 nanoseconds.

13. A method for mapping radio-frequency noise comprising the steps of:
   providing a plurality of frames containing radio-frequency amplitude data, each frame comprising a plurality of time bins;
   sampling radio-frequency amplitude data from the plurality of frames;
   identifying a plurality of corresponding time bins in each of the plurality of frames;

determining a difference between the radio-frequency amplitude in the corresponding time bins in successive frames, thereby obtaining a change in the radio-frequency amplitude in corresponding time bins across successive frames; and determining a difference between the change in the radio-frequency amplitude in corresponding time bins across successive frames, thereby obtaining a rate of change in the radio-frequency amplitude in corresponding time bins across successive frames.

14. The method for mapping radio-frequency noise of claim 13, wherein the sampled radio-frequency amplitude data is stored in matrix form, so that each frame comprises a row, and corresponding time bins comprise one or more columns.

15. The method for mapping radio-frequency noise of claim 14, wherein the matrix comprises $$S = \begin{bmatrix} A(f_0 t_0) & A(f_0 t_1) & \ldots & A(f_0 t_n) \\ A(f_1 t_0) & A(f_1 t_1) & \ldots & A(f_1 t_n) \\ \vdots & & & \\ A(f_{N-1} t_0) & A(f_{N-1} t_1) & \ldots & A(f_{N-1} t_n) \\ A(f_N t_0) & A(f_N t_1) & \ldots & A(f_N t_n) \end{bmatrix}$$

where matrix S contains a plurality of radio-frequency amplitude data samples, A is a discrete radio-frequency amplitude sample, f represents the frame number and t represents the time bin.

16. The method for mapping radio-frequency noise of claim 15, wherein determining a difference between the radio-frequency amplitude samples ii in the corresponding time bins $t_i$ in successive frames $f_j$, is obtained according to the following equation:

$$M4_{ji} = |A(t_{j+1} t_i) - A(f_j t_i)|,$$

thereby obtaining a change in the radio-frequency amplitude A in corresponding time bins $t_i$ across successive frames $f_j$.

17. The method for mapping radio-frequency noise of claim 16, wherein determining a difference between the change in the radio-frequency amplitude A in corresponding time bins $t_i$ across successive frames $f_j$, is obtained by values obtained in claim 16 according to the following equation:

$$M5_{ji} = |M4_{i+1} - M4_i|,$$

thereby obtaining a rate of change in the radio-frequency amplitude A in corresponding time bins $t_i$ across successive frames $f_j$.

18. The method for n-nipping radio-frequency noise of claim 13, further including the step of
ranking the radio-frequency noise by evaluating one or more of:
the plurality of radio-frequency amplitude averages of the corresponding time bins across successive frames;
the change in corresponding time bin radio-frequency amplitude averages across successive frames; and
the rate of change in corresponding time bin radio-frequency amplitude averages across successive frames.

19. The method for mapping radio-frequency noise of claim 13, further including the step of:
assigning a data transmission rate to one or more UWB communication channels, each UWB communication channel comprising a plurality of time bins.

20. The method for mapping radio-frequency noise of claim 19, wherein the data transmission rate for each UWB communication channel is based on the radio-frequency noise present in the channel time bins.

21. The method for mapping radio-frequency noise of claim 13, wherein a time period of each frame varies with a number of UWB communication channels present in the frame.

22. The method for mapping radio-frequency noise of claim 13, further including the step of inserting time bins into a frame to avoid detected radio-frequency noise.

23. The method for mapping radio-frequency noise of claim 13, wherein a duration of a time bin can range from about 40 picoseconds to about 100 nanoseconds.

24. A method for mapping radio-frequency noise in a multi-channel ultra-wideband communication system, the method comprising the steps of:
pseudo-randomly placing a plurality of time bins within a plurality of time frames;
assigning a plurality of channels comprising selected pseudo-randomly placed time bins;
sampling radio-frequency amplitude data from the selected pseudo-randomly placed time bins; and
averaging the radio-frequency amplitude data from the selected pseudo-randomly placed time bins, thereby obtaining an average radio-frequency amplitude in each of the plurality of channels.

25. The method for mapping radio-frequency noise in the multi-channel ultra-wideband communication system of claim 24, further comprising the step of:
determining an absolute value of a difference between the radio-frequency amplitude average in the corresponding time bins in each of the plurality of channels, thereby obtaining a change in the radio-frequency amplitude average in corresponding time bins across successive channels.

26. The method for mapping radio-frequency noise in the multi-channel ultra-wideband communication system of claim 25, further comprising the step of:
determining an absolute value of a difference of the change in the radio-frequency amplitude average in corresponding time bins across successive channels, thereby obtaining a rate of change in the radio-frequency amplitude average in corresponding time bins across successive channels.

27. The method for mapping radio-frequency noise in the multi-channel ultra-wideband communication system of claim 24, wherein the sampled radio-frequency amplitude data is stored in matrix form, so that each frame comprises a row, and the pseudo-randomly placed time bins comprise one or more columns.

28. Time method for mapping radio-frequency noise in the multi-channel ultra-wideband communication system of claim 27, wherein the matrix comprises:

$$S = \begin{bmatrix} A(f_0 t_0) & A(f_0 t_1) & \ldots & A(f_0 t_b) \\ A(f_1 t_0) & A(f_1 t_1) & \ldots & A(f_1 t_b) \\ \vdots & & & \\ A(f_{N-1} t_0) & A(f_{N-1} t_1) & \ldots & A(f_{N-1} t_b) \\ A(f_N t_0) & A(f_N t_1) & \ldots & A(f_N t_b) \end{bmatrix}$$

where matrix S contains a plurality of radio-frequency amplitude data samples, and A is a discrete radio-frequency amplitude sample, f represents the frame number and t represents the pseudo-randomly placed time bin.

29. The method for mapping radio-frequency noise in the multi-channel ultra-wideband communication system of claim 28, wherein averaging the radio-frequency amplitude data from selected pseudo-randomly placed time bins is performed according to the following equation:

$$\overline{M6_j} = \frac{1}{N+1}\sum_{j=0}^{N}\sum_{k=1}^{b} A(f_j t_k),$$

where $f_j$ is frame j, $t_k$ is the $k^{th}$ time slot allocated to the same channel in frame $f_j$, k is a pseudo-noise sequence of time bins b, and N is the number of frames over which the sequence is averaged, thereby obtaining an average radio-frequency amplitude in each of the plurality of channels.

30. The method for mapping radio-frequency noise in the multi-channel ultra-wideband communication system of claim 29, wherein determining an absolute value of a difference between the radio-frequency amplitude average in the corresponding time bins in each of the plurality of channels, is performed according to the following equation:

$$\overline{M7_j} = |\overline{M6_i} - \overline{M6_k}|,$$

where $M6_i$ is a time bin that follows $M6_k$ in a sequence of pseudo-randomly placed time bins allocated to a UWB communication channel;

thereby obtaining a change in the radio-frequency amplitude average in corresponding time bins across successive channels.

31. The method for mapping radio-frequency noise in the multi-channel ultra-wideband communication system of claim 30, wherein determining an absolute value of a difference of the change in the radio-frequency amplitude average in corresponding time bins across successive channels, is performed according to the following equation:

$$\overline{M8_j} = |\overline{M7_t} - \overline{M7_k}|,$$

where $M7_t$ is a time bin that follows $M7_k$ in a sequence of pseudo-randomly placed time bins allocated to a UWB communication channel;

thereby obtaining a rate of change in the radio-frequency amplitude average in corresponding time bins across successive channels.

32. The method for mapping radio-frequency noise in the multi-channel ultra-wideband communication system of claim 24, wherein time bins are randomly allocated by a pseudo-random time bin generator.

33. The method for mapping radio-frequency noise in the multi-channel ultra-wideband communication system of claim 24, further including the step of:
ranking the radio-frequency noise in a plurality of ultra-wideband communication channels by evaluating one or more of:
the plurality of radio-frequency amplitude averages in each of the plurality of ultra-wideband communication channels;
a change in the radio-frequency amplitude averages in corresponding time bins across successive ultra-wideband communication channels; and
the rate of change in the radio-frequency amplitude averages in corresponding time bins across successive ultra-wideband communication channels.

34. The method for mapping radio-frequency noise in the multi-channel ultra-wideband communication system of claim 24, further including the step of:

assigning a data transmission rate to one or more UWB communication channels.

35. The method for mapping radio-frequency noise in the multi-channel ultra-wideband communication system of claim 34, wherein, the data transmission rate for each UWB communication channel is based on the radio-frequency noise present in the channel time bins.

36. The method for mapping radio-frequency noise in the multi-channel ultra-wideband communication system of 24, wherein a time period of each frame varies with a number of UWB communication channels present in the frame.

37. The method for mapping radio-frequency noise in the multi-channel ultra-wideband communication system of claim 24, further including the step of inserting time bins into a frame to avoid detected radio-frequency noise.

38. The method for mapping radio-frequency noise in the multi-channel ultra-wideband communication system of claim 24, wherein a duration of a time bin can range from about 40 picoseconds to about 100 nanoseconds.

39. A system for mapping radio-frequency noise in a multi-channel ultra-wideband communication system comprising:
logic for pseudo-randomly placing a plurality of time bins within a plurality of time frames;
logic for assigning a plurality of channels comprising selected pseudo-randomly placed time bins;
logic for sampling radio-frequency amplitude data from the selected pseudo-randomly placed time bins; and
logic for averaging the radio-frequency amplitude data from the selected pseudo-randomly placed time bins, thereby obtaining an average radio-frequency amplitude in each of the plurality of channels.

40. The system for mapping radio-frequency noise in the multi-channel ultra-wideband communication system of claim 39, further comprising:
logic for determining an absolute value of a difference between the radio-frequency amplitude average in the corresponding time bins in each of the plurality of channels, thereby obtaining a change in the radio-frequency amplitude average in corresponding time bins across successive channels.

41. The system for mapping radio-frequency noise in the multi-channel ultra-wideband communication system of claim 40, further comprising:
logic for determining an absolute value of a difference of the change in the radio frequency amplitude average in corresponding time bins across successive channels,
thereby obtaining a rate of change in the radio-frequency amplitude average in corresponding time bins across successive channels.

42. The system for mapping radio-frequency noise in the multi-channel ultra-wideband communication system of claim 39, wherein time bins are randomly allocated by a pseudo-random time bin generator.

43. The system for mapping radio-frequency noise in the multi-channel ultra-wideband communication system of claim 39, further including:
logic for ranking the radio-frequency noise in a plurality of ultra-wideband communication channels by evaluating one or more of:
the plurality of radio-frequency amplitude averages in each of the plurality of ultra-which and communication channels;
a change in the radio-frequency amplitude averages in corresponding time bins across successive ultra-wideband communication channels; and the rate of change in the radio-frequency amplitude averages in corresponding time bins across successive ultra-wideband communication channels.

44. The system for mapping radio-frequency noise in the multi-channel ultra-wideband communication system of claim 39 further including:

logic for assigning a data transmission rate to one or more UWB communication channels.

45. The system for mapping radio-frequency noise in the multi-channel ultra-wideband communication system of claim 44 wherein the data transmission rate for each UWB communication channel is based on the radio-frequency noise present in the channel time bins.

46. A method for estimating channel quality in a multi-channel ultra-wideband communication system, the method comprising the steps of:

pseudo-randomly placing a plurality of time bins within a plurality of time frames, each time bin comprising one or more data bits;

assigning a plurality of channels comprising selected pseudo-randomly placed time bins;

transmitting a multiplicity of data bits through the plurality of channels; monitoring the number of data bits transmitted through each channel; determining a number of data bit errors in the transmissions;

determining a projected bit error rate for at least one transmission; and grading a channel quality using at least the projected bit error rate, wherein the projected bit error rate for at least one transmission is obtained iteratively through the following equation:

$$PBER = -\frac{\ln(1-CL)}{n} + \frac{\ln\left(\sum_{k=0}^{N} \frac{(n \cdot PBER)^k}{k!}\right)}{n}$$

where PBER is a projected value of the bit error rate, n is the number of bits transmitted, CL is a statistical confidence that the bit error rate will be less than or equal to the projected bit error rate, N is the total number of bit errors that occur during the transmission, and k refers to a $k^{th}$ bit error.

* * * * *